United States Patent
Tang et al.

(10) Patent No.: US 12,307,486 B2
(45) Date of Patent: May 20, 2025

(54) BLOCKCHAIN-BASED MEMBER TRACKING SYSTEM

(71) Applicant: AVIVID INNOVATIVE MEDIA CO., LTD, Taipei (TW)

(72) Inventors: Yu Ju Tang, Taipei (TW); Chih-Yao Lin, Taipei (TW)

(73) Assignee: AVIVID INNOVATIVE MEDIA CO., LTD, Taipei (TW)

( * ) Notice: Subject to any disclaimer, the term of this patent is extended or adjusted under 35 U.S.C. 154(b) by 0 days.

(21) Appl. No.: 18/515,245

(22) Filed: Nov. 20, 2023

(65) Prior Publication Data

US 2024/0169394 A1    May 23, 2024

(30) Foreign Application Priority Data

Nov. 23, 2022    (TW) .................................. 111144807

(51) Int. Cl.
*G06Q 30/0251*    (2023.01)
*G06Q 30/0241*    (2023.01)

(52) U.S. Cl.
CPC ..... *G06Q 30/0257* (2013.01); *G06Q 30/0269* (2013.01); *G06Q 30/0277* (2013.01)

(58) Field of Classification Search
CPC ........... G06Q 30/0257; G06Q 30/0269; G06Q 30/0277
See application file for complete search history.

(56) References Cited

U.S. PATENT DOCUMENTS

| | | | |
|---|---|---|---|
| 2020/0005284 A1* | 1/2020 | Vijayan | H04L 9/3247 |
| 2020/0084483 A1* | 3/2020 | Brown | G06Q 20/405 |
| 2021/0119801 A1* | 4/2021 | Kim | H04L 63/123 |
| 2023/0334534 A1* | 10/2023 | Landers | G06Q 30/0277 |
| 2024/0223371 A1* | 7/2024 | Narayanan | H04L 9/50 |

OTHER PUBLICATIONS

Privacy-preserving targeted mobile advertising:A Blockchain-based framework for mobile ads Imdad Ullah, Member, IEEE, Salil S. Kanhere, Senior Member, IEEE, and Roksana Boreli (Year: 2020).*

* cited by examiner

*Primary Examiner* — Alexandru Cirnu
(74) *Attorney, Agent, or Firm* — Best & Flanagan LLP

(57) ABSTRACT

A blockchain-based member tracking system, communicatively connected to multiple web servers and multiple user devices, comprises an advertising database, multiple advertising modules, a primary member database, and a blockchain module. The advertising modules are configured to run on the web servers and are configured for displaying the advertising data. When the user device connects to the web server, the blockchain module generates a set of the preference tags and a set of the point data, and associates them with the corresponding member data of the user device. When the user device connects to the web server, the advertising module selects the advertising data based on the corresponding member data and the preference tags. The preference tags are a form of non-fungible token data.

5 Claims, 5 Drawing Sheets

BLOCKCHAIN-BASED MEMBER TRACKING SYSTEM

BACKGROUND OF THE INVENTION

1. Field of the Invention

The present invention relates generally to the field of member tracking system, and more specifically to a blockchain-based member tracking system.

2. Description of the Prior Art

Cookies are a widely used technology in web development. When a user connects to a website through a device, the website places a cookie on the user's device. Cookies can store various types of user data, such as identity, browsing history, and behavior. When the user's device visits other websites, those websites can read the user's data through the cookie for various applications, such as delivering targeted advertisements to improve the accuracy of ad placements.

However, in recent years, there has been a growing awareness among the public regarding the protection of personal data. There is increasing resistance to the use of cookies for collecting personal preferences, especially as third-party cookies are becoming more restricted or even prohibited. This phenomenon is known as "Cookieless," and it poses significant challenges for ad targeting.

Therefore, how to overcome the above-mentioned issues is a matter worth considering for those skilled in the art.

SUMMARY OF THE INVENTION

In light of the aforementioned issues, the presented invention introduces a blockchain-based member tracking system that records user behavior using a blockchain wallet. Moreover, this wallet can be used across multiple websites, achieving the effect of collecting user behavior without the use of cookies. The specific technical features are as follows:

A blockchain-based member tracking system, communicatively connected to multiple web servers and multiple user devices, includes an advertising database, multiple advertising modules, a primary member database, multiple secondary member databases, and a blockchain module. The secondary member databases are configured to run on the web servers, storing multiple sets of member data. The primary member database extracts the member data from the secondary member databases, each set of member data corresponding to a user device. The advertising database stores multiple sets of advertising data. The advertising modules are configured to run on the web servers, configured for displaying the advertising data. The blockchain module includes multiple sets of wallet data, multiple sets of preference tags, and multiple sets of point data, the wallet data corresponding to the member data, and the preference tags and point data are stored within the wallet data. When the primary member database obtains the member data from the secondary member databases, it establishes a connection between the member data and the user device. When the user device connects to the web server and clicks on the advertising module, the blockchain module generates a set of wallet data, a set of preference tags, and a set of point data, and associates them with the corresponding user device and corresponding member data. When the user device connects to the web server, the advertising module selects the advertising data based on the corresponding member data and preference tags of the user device. The preference tags are a form of non-fungible token data.

The aforementioned blockchain-based member tracking system also includes a shopping module.

In the aforementioned blockchain-based member tracking system, the web server is configured for generating and sending multiple sets of preference data to the blockchain-based member tracking system based on the behavior of the user device, and the blockchain module generates the preference tags based on the preference data.

In the aforementioned blockchain-based member tracking system, each set of member data also includes a blockchain identifier, and the user device is also configured for entering the blockchain identifier to obtain corresponding member data.

The aforementioned blockchain-based member tracking system is also configured for providing the member data, the preference tags, and the point data to the user device.

In the aforementioned blockchain-based member tracking system, the user device is also configured for connecting to the blockchain-based member tracking system and modifying the member data and the preference tags.

In the aforementioned blockchain-based member tracking system, the web server also includes a secondary member database, storing multiple sets of website member data, and the blockchain module generates the preference tags based on the website member data.

In the aforementioned blockchain-based member tracking system, when the preference tags within the wallet data reach a predetermined number, the blockchain module generates new preference tags to replace the preference tags within the wallet data.

In the aforementioned blockchain-based member tracking system, the preference tags are a form of dynamic non-fungible token data, and the blockchain module is also configured for modifying the content of the preference tags.

BRIEF DESCRIPTION OF THE DRAWINGS

The objects, spirits, and advantages of the preferred embodiments of the present invention will be readily understood by the accompanying drawings and detailed descriptions, wherein.

DETAILED DESCRIPTION OF THE INVENTION

Figure 1:
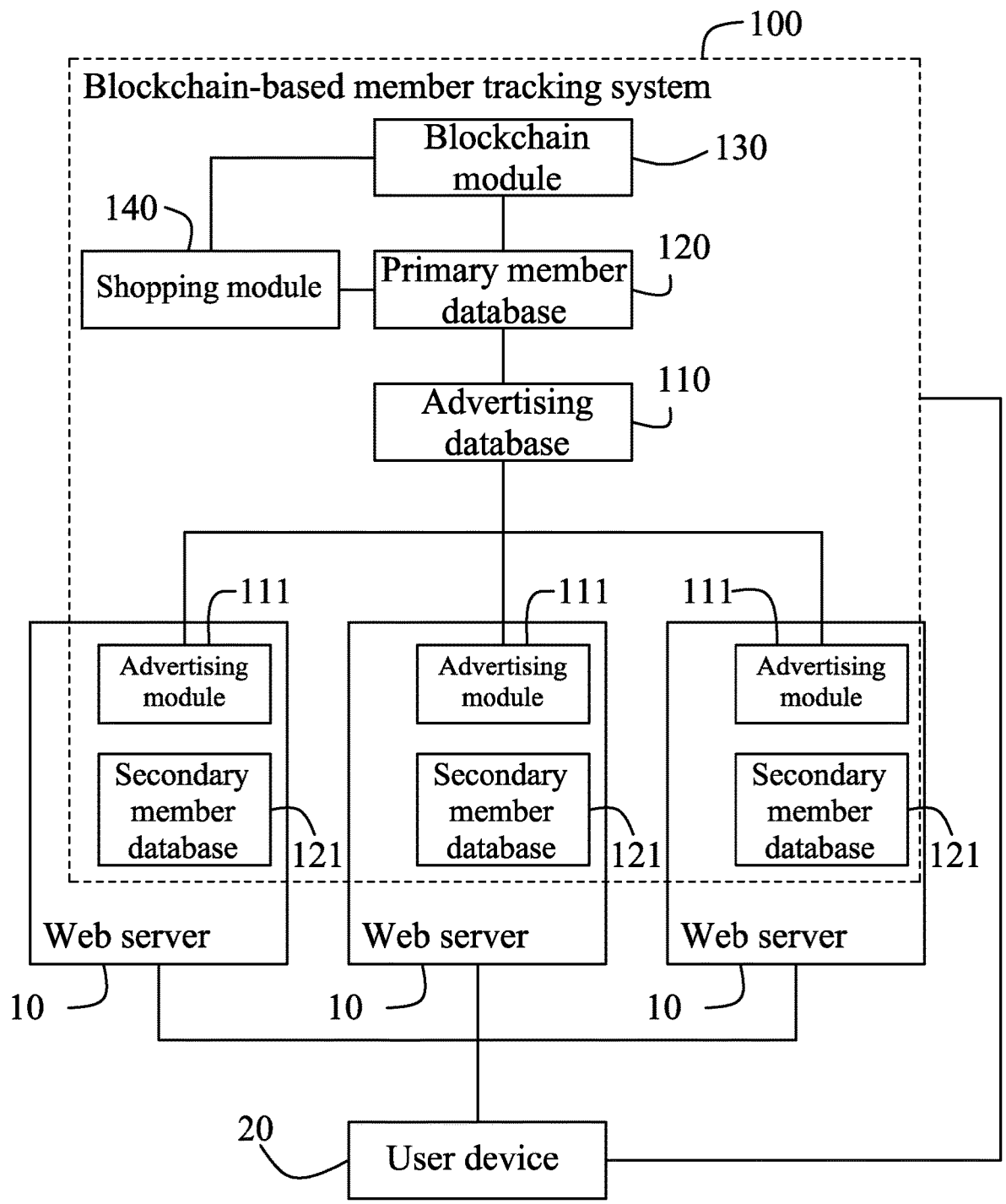
FIG. 1 illustrates the blockchain-based member tracking system of the present invention.

Refer to FIG. 1, which illustrates the blockchain-based member tracking system 100 of the present invention. The blockchain-based member tracking system 100 is communicatively connected to multiple external web servers 10 and multiple user devices 20. The external web servers 10, for example, can be content-providing websites that can post advertisements, such as news, product sales, or multimedia websites. User devices 20 are the devices used by the visitors of these websites, such as smartphones or personal computers. The blockchain-based member tracking system 100 is connected to the web servers 10 and user devices 20.

The blockchain-based member tracking system 100 includes an advertising database 110, multiple advertising modules 111, a primary member database 120, multiple secondary member databases 121, a blockchain module 130, and a shopping module 140. The advertising modules 111 are set up in each of the web servers 10 and are communicatively connected to the advertising database 110. The advertising database 110 stores multiple sets of advertising data, and the advertising modules 111 are configured for displaying these advertising data. In other words, when the user device 20 connects to the web server 10, it can browse these advertising data through the advertising modules 111 on each of the web servers 10. In one embodiment, each set of advertising data also includes at least one attribute tag, which serves as the basis for the advertising database 110 to select.

The secondary member databases 121 are set up in the web servers 10, and multiple secondary member databases 121 store multiple sets of member data. Specifically, the secondary member databases 121 can be used as the member system of the web servers 10 themselves for the web servers 10 to use. At the same time, the secondary member databases 121 will also provide member data to the blockchain-based member tracking system 100. In other words, the member data of the members who register on these web servers 10 will be sent to the primary member database 120.

The primary member database 120 is configured for obtaining member data from each of the secondary member databases 121, and these member data correspond to the user device 20, for example, they correspond to the Unique Identifier in the user device 20. The blockchain module 130 includes multiple sets of wallet data, multiple sets of preference tags, and multiple sets of point data, that is, the wallet data, preference tags, and point data are based on blockchain data. The preference tags are a form of non-fungible token (NFT). In addition, these preference tags and point data will be associated with the wallet data, and the wallet data corresponds to the member data. In other words, each member in the blockchain-based member tracking system 100 will have a virtual wallet to store preference tags and point data. The point data is a cryptocurrency issued using the blockchain, and the preference tags are non-fungible tokens generated using the blockchain.

Preference tags, for example, can be categories of multimedia content or goods, or specific keywords, used to indicate each member's preference for advertisements. For example, preference tags can be cosmetics (product category), entertainment news (multimedia content category), artist names (specific keywords), or hashtags. Furthermore, when the user device 20 connects to the web server 10, the advertising database 110 will select the advertising data corresponding to the preference tags based on the member data, wallet data, and preference tags corresponding to the user device 20, and send it to the advertising module 111, so that the advertising data is disclosed on the user device 20. Specifically, the advertising data is selected based on the attribute tags of the advertising data, and the advertising data with attribute tags corresponding to the preference tags is selected and sent to the advertising module 111.

In one embodiment, when the preference tags in the wallet data reach a predetermined number, the blockchain module 130 will generate new preference tags to replace the original preference tags in the wallet data. For example, when a member visits different websites multiple times and continuously obtains different preference tags, and when the preference tags held by the member reach a certain number, the blockchain module 130 will generate new preference tags (i.e., dNFT), replacing the preference tags held by the member. This avoids the existence of too many NFTs in the blockchain, and can accurately reflect the member's preferences.

In another embodiment, the preference tags are a form of dynamic non-fungible token (dNFT). In other words, the blockchain module 130 can dynamically adjust the content of the preference tags. Specifically, non-fungible tokens include a Unique Identifier (TokenID) and metadata, and the metadata of the dynamic non-fungible token is dynamically adjustable. Therefore, the blockchain module 130 can adjust the content of the metadata based on user behavior, using this dNFT as a preference tag to reflect the user's preferences.

When the user device 20 clicks on the advertising data displayed by the advertising module 111, the blockchain-based member tracking system 100 will give the user points, equivalent to giving feedback to the user for clicking on the advertisement. Specifically, when the user device 20 clicks on the advertising data displayed by the advertising module 111, the blockchain module 130 will generate preference tags and point data, and store the generated preference tags and point data in the wallet data of the member data corresponding to the user device 20. That is, it gives the member preference tags (NFT or dNFT) and point data (cryptocurrency).

Therefore, the blockchain-based member tracking system 100 also includes a shopping module 140, and users can use the point data as currency to purchase goods through the shopping module 140. This encourages users to click on advertisements, increasing the click-through rate of the advertisements.

In one embodiment, each set of member data also includes a blockchain identifier. When the user device 20 connects to different web servers 10, the blockchain identifier will serve as a means of identity recognition. For example, when the user device 20 connects to different web servers 10, the advertising module 111 will send a request to the user device 20 to enter the blockchain identifier. If the user enters the blockchain identifier through the user device 20, the blockchain-based member tracking system 100 can use this blockchain identifier to re-establish the association between the corresponding member data and the user device 20, thereby tracking the same user's behavior on different web servers 10. The following will explain the operation scenario of the blockchain-based member tracking system 100.

Figure 2A:
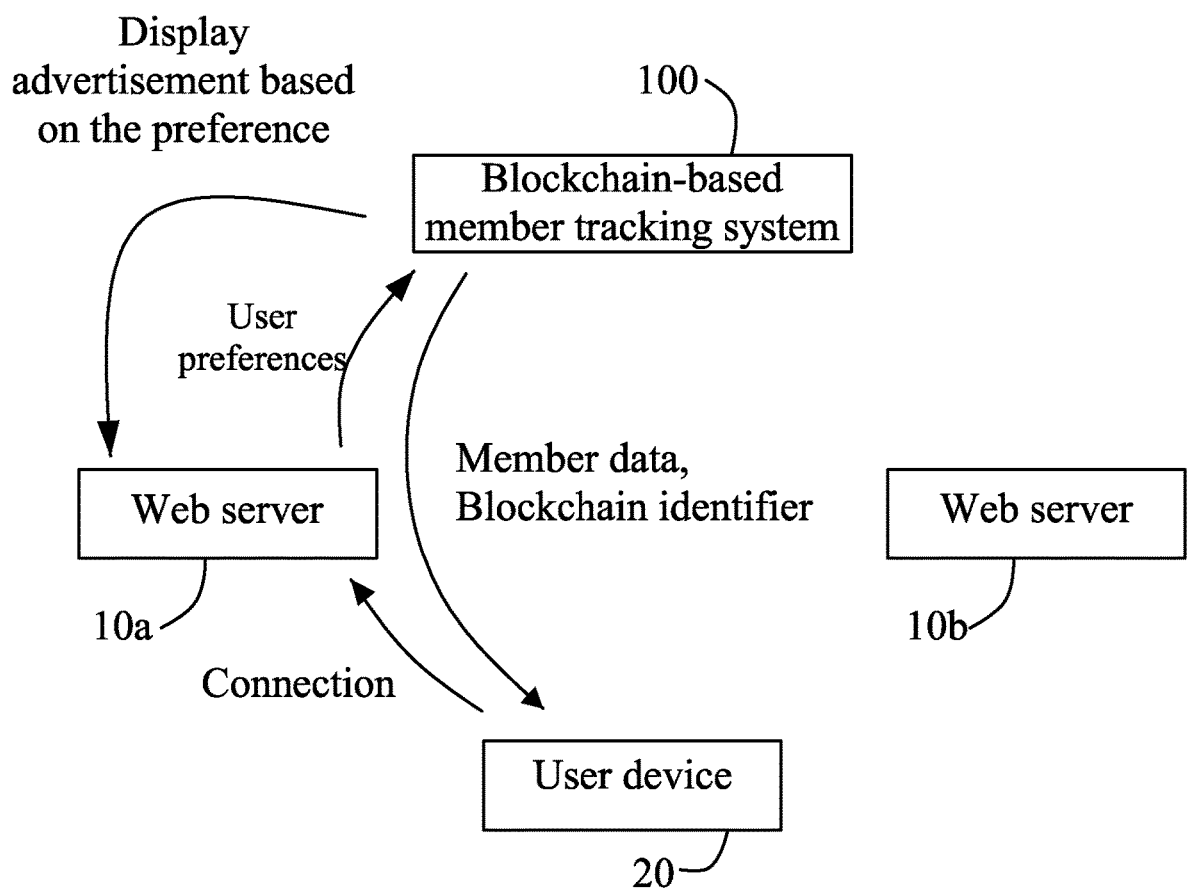
FIGS. 2A to 2C illustrate the operation scenario of the blockchain-based member tracking system.
Figure 2B:
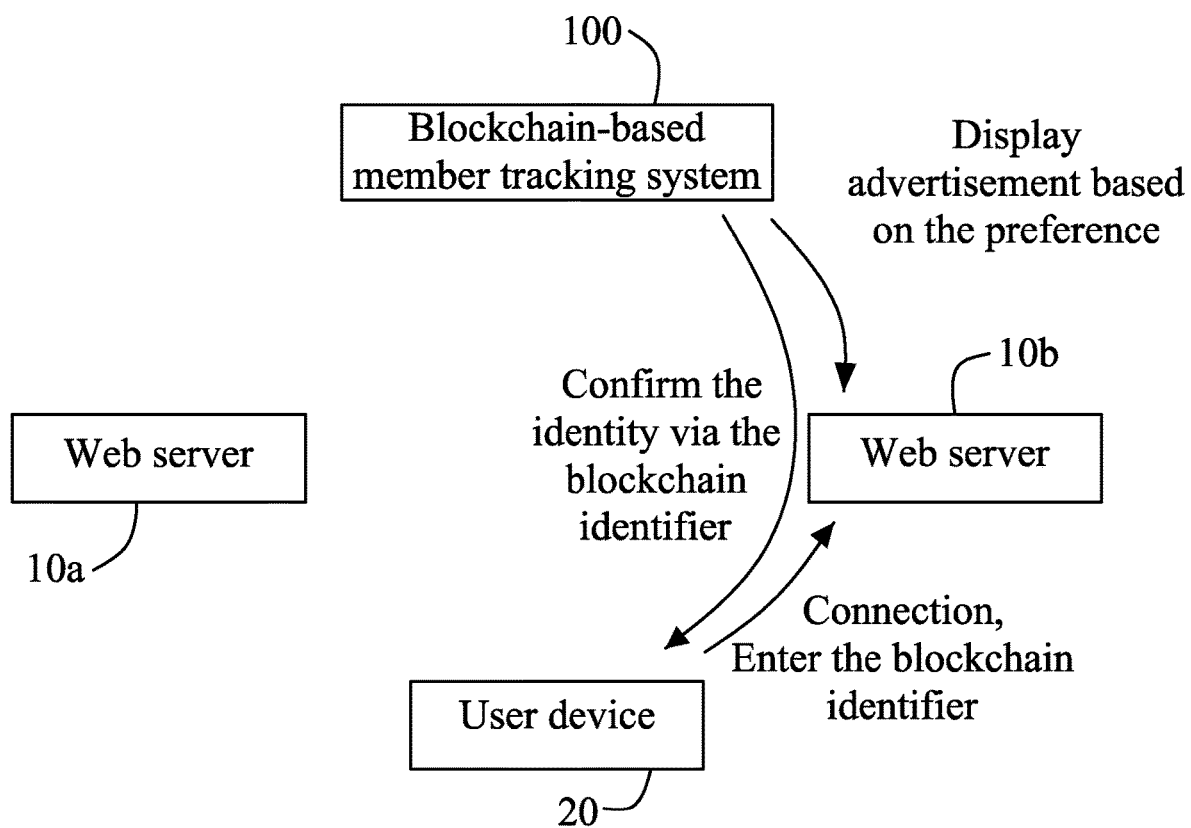
Figure 2C:
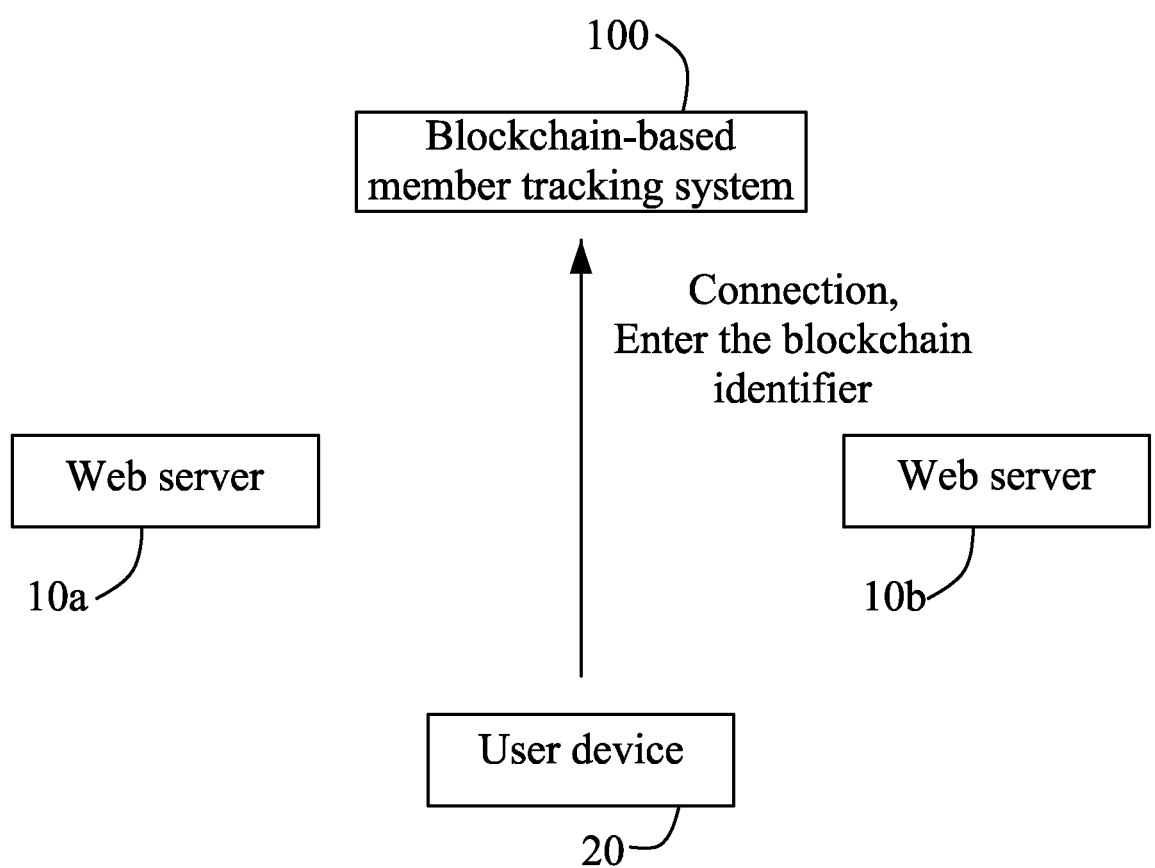

Please refer to FIGS. 2A to 2C, which illustrate the operation scenario of the blockchain-based member tracking system 100. Please refer to FIG. 2A first. When the user device 20 first connects to the web server 10a, and the user registers on the web server 10a to form member data in the secondary member database 121a in the web server 10a. The web server 10a will generate preference data based on the behavior of the user device 20 on the web server 10a and send it to the blockchain-based member tracking system 100. The behavior of the user device 20 on the web server 10a includes, for example, browsing preferences for web page content (such as product or article categories) and the categories of advertisements clicked.

After the blockchain-based member tracking system 100 receives these preference data, it will obtain the member data from the secondary member database in the web server 10a and store it in the primary member database 120, and generate the corresponding blockchain identifier, wallet data, and generate preference tags. It establishes a connection between the member data, the blockchain identifier, and the user device 20, and stores the corresponding generated preference tags in the wallet data. The blockchain identifier will be sent to the user device 20, allowing the user to note down the blockchain identifier.

At the same time, the blockchain-based member tracking system 100 will also select and send advertising data from the advertising database 110 to the advertising module 111 in the web server 10a based on the preference tags, that is, it displays advertisements based on the user's preferences. If the user clicks on the advertisement, the blockchain-based member tracking system 100 will further issue point data and store it in the corresponding member data's wallet data.

Next, please refer to FIG. 2B. When the user device 20 connects to another web server 10b, the user can enter the blockchain identifier through the user device 20. The blockchain-based member tracking system 100 can obtain the blockchain identifier through the web server 10b, thereby confirming the identity of the user device 20, and further send advertising data to the web server 10b based on the corresponding preference tags, to achieve precise delivery of advertisements. On the other hand, if the user clicks on an advertisement on the web server 10b, the blockchain-based member tracking system 100 can also issue point data and store it in the corresponding member data's wallet data, allowing users to accumulate points on different websites.

Moreover, if the user device 20 fails to enter the blockchain identifier when connecting to the web server 10b, the web server 10b can perform the same actions as the web server 10a depicted in FIG. 2A, capturing user behavior to provide to the blockchain-based member tracking system 100, allowing the blockchain-based member tracking system 100 to obtain member data and assign preference tags and the blockchain identifier corresponding to the member data.

Refer to FIG. 2C, in one embodiment, the user device 20 can also directly connect to the blockchain-based member tracking system 100, further enter the blockchain identifier, browse the corresponding member data and wallet data from the blockchain-based member tracking system 100, and the user can also modify the member data or preference tags through the user device 20 to adjust the preference tags. In addition, the user can also use the shopping module 140 to use their own point data (cryptocurrency) for consumption or transactions.

Figure 3:
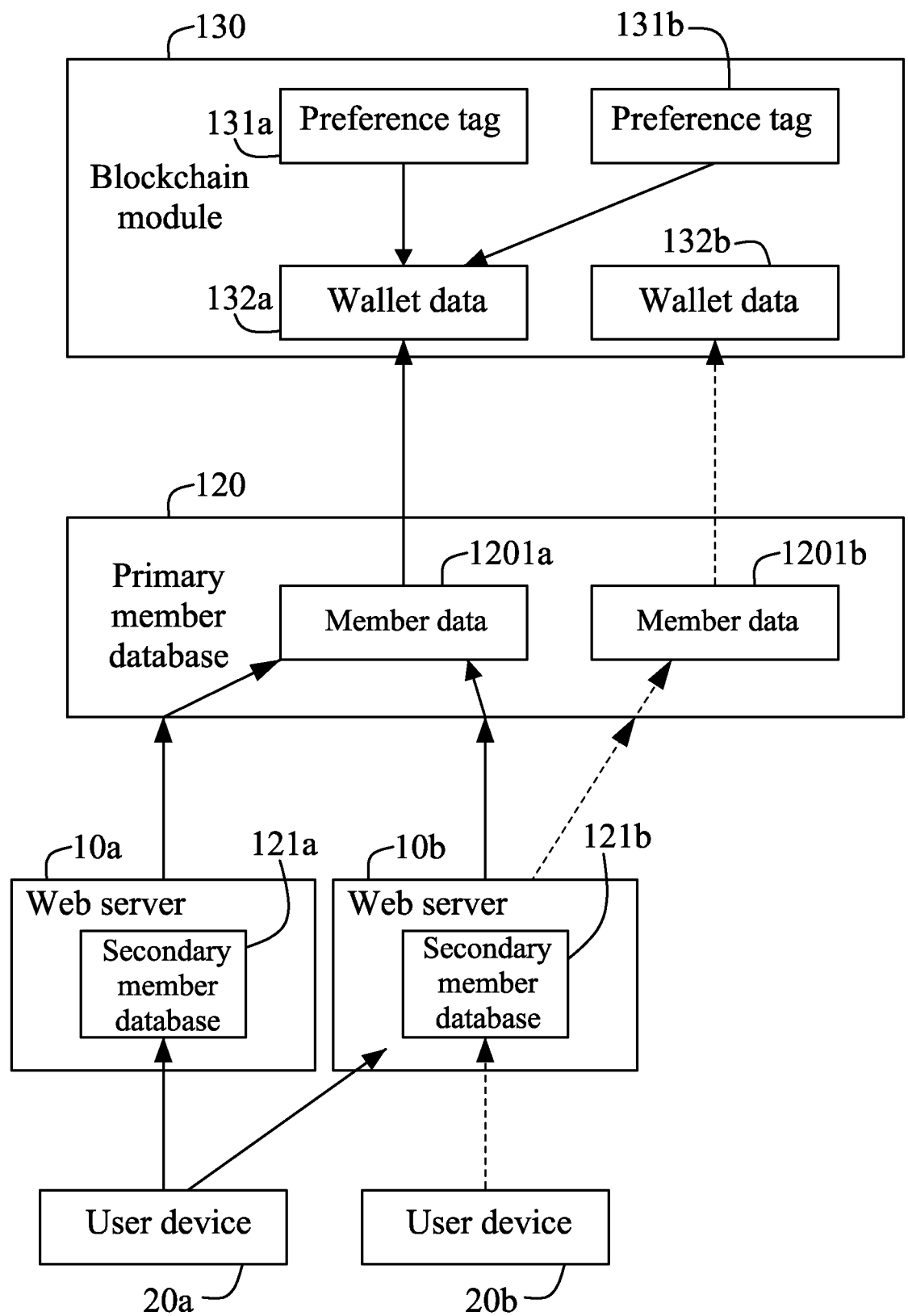
FIG. 3 illustrates the relationship between preference tags and users.

Refer to FIG. 3, FIG. 3 illustrates the relationship between preference tags and users. In FIG. 3, when the user device 20a connects to the web server 10a and registers on the web server 10a, the primary member database 120 subsequently obtain member data 1201a from the secondary member database 121a. This member data 1201a corresponds to the user device 20a. Simultaneously, the blockchain module 130 generates corresponding wallet data 132a, associates it with member data 1201a, and generates preference tags 131a to store in the wallet data 132a. In this way, a connection is established between the user device 20a, the member data 1201a, and the wallet data 132a.

Next, when the user device 20a connects to another web server 10b, and registers on the web server 10b, the primary member database 120 will obtain member data from the secondary member database 121b. Using the blockchain identifier or data comparison, it confirm that this data matches member data 1201a and can then access the corresponding wallet data 132a. At the same time, based on the behavior of the user device 20a on the web server 10b, another preference tag 131b is generated and stored in the wallet data 132a. This allows for tracking the preferences of the user device 20a.

And when another user device 20b connects to the web server 10b and registers, because it does not have a blockchain identifier, when the primary member database 120 obtains data from the secondary member database 121b, it will generate another member data 1201b, and the blockchain module 130 generates another wallet data 132b corresponding to member data 1201b.

It is worth noting that, in this embodiment, preference tags 131a and 131b are stored in the wallet data 132a in the blockchain module 130 in the form of NFTs, which are distinctive. Therefore, even if the user device 20b visits the web server 10b, and has similar behavior to the user device 20a, the blockchain module 130 will still generate new preference tags to store in the wallet data 132a. And when the preference tags stored in the wallet data 132a reach a predetermined number, the blockchain module 130 will generate new preference tags to replace the original preference tags (for example, preference tags 131a and 131b), to integrate the preference tags.

In another embodiment, preference tags 131a and 131b are stored in the wallet data 132a in the blockchain module 130 in the form of dNFTs. If the user device 20a continues to visit different web servers 10, the blockchain module 130 will adjust the content of preference tags 131a or 131b based on the web servers 10 visited by the user device 20a, to represent the user's preferences.

The blockchain-based member tracking system 100 of the present invention uses the characteristics of the blockchain having a wallet, cryptocurrency, and tokens, and connects them with the data of web page visitors, thereby tracking these users' behavior on different websites, to achieve precise advertising. In an environment where third-party Cookies are prohibited, precise advertising can still be implemented. And the cryptocurrency in the blockchain is used as points to encourage users to click on advertisements, which can also increase the exposure of advertisements, and attract users to join the blockchain-based member tracking system 100.

What is claimed is:

1. A computer-implemented blockchain-based member tracking system, communicatively connected to multiple web servers and multiple user devices, comprising:
   an advertising database, positioned externally from the web servers and communicatively connected to at least one of the web servers, the advertising database storing multiple sets of advertising data;
   multiple advertising modules configured to run on the web servers, the multiple advertising modules configured for displaying the advertising data from the advertising database;
   multiple secondary member databases configured to run on the web servers, storing multiple sets of member data;
   a primary member database, positioned externally from the web servers and communicatively connected to at least one of the secondary member databases, the primary member database extracting the member data from the secondary member databases, each set of the member data corresponding to a user device; and
   a blockchain module, positioned externally from the web servers and communicatively connected to the primary member database, the blockchain module including:
      multiple sets of wallet data corresponding to the member data;
      multiple sets of preference tags stored within the wallet data, wherein the preference tags are a form of dynamic non-fungible token data and content of the preference tags is dynamically adjusted based on the behavior of the user device; and
      multiple sets of point data stored within the wallet data;

wherein, upon a first connection of the user device to at least one of the web servers, the user device is registered with a blockchain identifier, the blockchain identifier being a unique identifier corresponding to the wallet data of the user device;

wherein, when the primary member database obtains the member data from the secondary member databases, the primary member database establishes a connection between the member data and the user device, based upon the blockchain identifier of the user device;

wherein, when the user device connects to the web server and clicks on the advertising module, the blockchain module generates a set of the wallet data, a set of the preference tags, and a set of the point data, and associates them with the corresponding user device and corresponding member data, the corresponding user device being identified via the blockchain identifier;

wherein, when the preference tags within the wallet data reach a predetermined number, the blockchain module generates new preference tags to replace the preference tags within the wallet data;

wherein, when the user device connects to the web server, the advertising database selects the advertising data based upon the preference tags, thereby configuring the advertising data displayed on the multiple advertising modules;

wherein the blockchain module provides tracking of the user device across multiple web servers without the use of cookies, thereby improving user privacy and data security.

2. The blockchain-based member tracking system according to claim 1, further comprising a shopping module, positioned externally from the web servers communicatively connected to the blockchain module.

3. The blockchain-based member tracking system according to claim 1, wherein the web server is configured for generating and sending multiple stets of preference data to the blockchain member tracking system based on the behavior of the user device, and the blockchain module generates the preference tags based on the preference data, wherein the content of the preference tags is dynamically adjusted based on the on the preference data.

4. The blockchain-based member tracking system according to claim 1, also configured for providing the member data, the preference tags, and the point data to the user device.

5. The blockchain-based member tracking system according to claim 1, wherein the user device is also configured for connecting to the blockchain-based member tracking system and modifying the member data and dynamically adjusting the content of the preference tags.

* * * * *